United States Patent [19]

Muse, Jr. et al.

[11] Patent Number: 4,855,362

[45] Date of Patent: Aug. 8, 1989

[54] POLYMER ALLOY

[75] Inventors: Joel Muse, Jr., Kent; Howard A. Colvin, Tallmadge, both of Ohio

[73] Assignee: The Goodyear Tire & Rubber Company, Akron, Ohio

[21] Appl. No.: 138,422

[22] Filed: Dec. 28, 1987

[51] Int. Cl.⁴ .......................... C08L 9/00; C08L 9/02; C08L 23/16; C08L 23/26
[52] U.S. Cl. ...................... 525/194; 525/192; 525/211; 525/232; 525/237; 525/233
[58] Field of Search ............... 525/194, 211, 232, 233

[56] References Cited

U.S. PATENT DOCUMENTS

| | | | |
|---|---|---|---|
| 3,970,133 | 7/1976 | Hopper | 525/194 |
| 4,202,801 | 5/1980 | Peterson | 525/232 |
| 4,299,931 | 11/1981 | Coran et al. | 525/194 |
| 4,409,365 | 10/1983 | Coran et al. | 525/194 |

*Primary Examiner*—Carman J. Seccuro
*Attorney, Agent, or Firm*—Alvin T. Rockhill

[57] ABSTRACT

The present invention reveals a polymer alloy which is comprised of (a) at least one highly unsaturated rubbery polymer which is covulcanized with at least one N-chlorothio-sulfonamide modified EPDM rubber and (b) at least one thermoplastic resin. A blend of polypropylene with nitrile rubber which has been cocured with an N-chlorothio-sulfonamide modified EPDM rubber is a representative example of such a polymer alloy.

19 Claims, No Drawings

POLYMER ALLOY

BACKGROUND OF THE INVENTION

Thermoplastic elastomers display the properties of rubber and can be processed as thermoplastics. In other words, they can be processed into articles of manufacture utilizing conventional thermoplastic processing techniques, such as injection molding or good extrusion. Thermoplastic elastomers generally exhibit flexibility, elastic recovery and resilience.

It is advantageous to utilize thermoplastic elastomers instead of thermosetting rubbers where possible to reduce processing costs. This is because the process cycle time with thermoplastic elastomers is less than the processing cycle time of conventional rubbers. Additionally, the scrap which is generated in the processing of thermoplastic elastomers can be readily recycled. This is in contrast to operations which utilize thermosetting rubbers wherein scrap which is generated after curing cannot be reprocessed. For these reasons, thermoplastic elastomers generally allow for much more efficient plant and equipment utilization than do thermosetting rubbers.

Various blends of rubbers with thermoplastic materials have been prepared which exhibit the properties of thermoplastic elastomers. Such blends are described in U.S. Pat. No. 4,104,210, U.S. Pat. No. 4,130,535, and U.S. Pat. No. 4,355,139. Such blends are also described in detail in Coran and Patel, *Rubber-Thermoplastic Compositions, Part I EPDM-Polypropylene Thermoplastic Vulcanizates*, 53 Rubber Chemistry and Technology, 141–150 and Coran, Patel, and Williams, *Rubber-Thermoplastic Compositions, Part V Selecting Polymers for Thermoplastic Vulcanizates*, 55 Rubber Chemistry and Technology, 116–136. One of the most useful types of blends described in these references is blends of EPDM rubber with polypropylene. Such blends have superior strength, high-temperature mechanical properties and good compression set. However, such blends exhibit only fair solvent resistance. Coran describes the dynamic vulcanization of such blends and is herein incorporated by reference in its entirety.

Nitrile rubbers are known to exhibit excellent resistance to organic solvents, such as oils. However, the simple blending of EPDM rubber with nitrile rubber leads to poor physical properties because the two polymers are incompatible. Thus, it is not possible to improve the solvent resistance of EPDM/polypropylene blends by simply incorporating a nitrile rubber therein without destroying the desirable physical properties of such blends.

SUMMARY OF THE INVENTION

This invention discloses a means of incorporating EPDM rubbers into blends of highly unsaturated rubbery polymers with thermoplastic resins. These blends take advantage of the best properties of both the EPDM and highly unsaturated rubbery polymer. This combination in a thermoplastic matrix forms a polymer blend which acts as a thermoplastic elastomer. These desirable attributes are attained by cocuring the EPDM rubber with the highly unsaturated rubber utilized in the polymer alloy.

Standard EPDM rubbers cannot be effectively covulcanized with highly unsaturated rubbers. This is because EPDM rubbers vulcanize at a substantially slower rate than do highly unsaturated rubbers. For this reason, attempts to convulcanize highly unsaturated rubbery polymers with conventional EPDM rubbers have not yielded good results. However, EPDM rubbers can be modified with N-chlorothio-sulfonamides so as to make them readily cocurable with highly unsaturated rubbery polymers. It has been discovered that blends of unvulcanized modified EPDM and additional rubbery polymers can be dynamically vulcanized during mixing with a thermoplastic resin to yield compositions which have highly desirable properties. For instance, such compositions are thermoplastic in nature and can accordingly be molded into useful articles which are elastomeric in nature.

The present invention more specifically discloses a polymer alloy which is comprised of (a) at least one highly unsaturated rubbery polymer which is covulcanized with at least one N-chlorothio-sulfonamide modified EPDM rubber and (b) at least one thermoplastic resin. The subject invention also relates to a process for preparing a polymer alloy which comprises (a)) dispersing at least one highly unsaturated rubbery polymer and at least one N-chlorothio-sulfonamide modified EPDM throughout at least one thermoplastic polyolefin to produce at least a two phase immiscible polymer blend and (b) heating the polymer blend to a temperature and for a time sufficient to convulcanize the highly unsaturated rubbery polymer and the N-chlorothio-sulfonamide modified EPDM to produce the polymer alloy.

Nitrile rubbers can be utilized in the alloys of the present invention in order to provide compositions which have good ozone resistance and outstanding solvent resistance. Thus, the present invention also specifically reveals a polymer alloy which is comprised of (a) a nitrile rubber which is covulcanized with at least one N-chlorothio-sulfonamide modified EPDM rubber and (b) at least one thermoplastic polyolefin.

DETAILED DESCRIPTION OF THE INVENTION

The highly unsaturated rubbery polymer which is utilized in the alloys of the present invention can be essentially any sulfur curable rubber. Some representative examples of suitable highly unsaturated rubbery polymers include nitirle rubber, styrene-butadiene rubber, butyl rubber, natural rubber, synthetic polyisoprene, polybutadiene and carboxylated nitrile rubber. Polypentenamers which are synthesized by olefin metathesis can also be utilized as the highly unsaturated rubbery polymer in such polymer alloys.

The EPDM rubbers which are utilized in accordance with this invention are terpolymers of ethylene, propylene and a diene monomer. Such EPDM rubbers will generally have a molar ratio of ethylene to propylene which is within the range of about 30/70 to about 70/30 and will contain from about 0.1 to about 0.8 moles of diene monomer per kilogram of polymer. The diene monomer utilized in the EPDM rubber will preferably be a non-conjugated diene monomer containing from 6 to 12 carbon atoms. Some representative examples of suitable non-conjugated diene monomers include 1,4-hexadiene, dicyclopentadiene, 5-ethylidene-2-norbornene, 5-methylene-2-norbornene, 4,7,8,9-tetrahydroindene, and 1,5-cyclooctadiene.

The N-chlorothio-sulfonamides utilized in this invention to modify EPDM rubbers to make them sulfur curable have the structural formula:

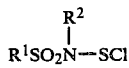

where $R^1$ and $R^2$ are selected from the group consisting of alkyl radicals having 1 to 20 carbon atoms, aryl radicals having 7 to 20 carbon atoms, and haloaryl radicals having 6 to 10 carbon atoms and where $R^1$ is also selected from radicals having the formula:

where $R^3$ and $R^4$ are individually selected from said alkyl, aryl, and haloaryl radicals and where $R^3$ and $R^4$ can be joined together to represent radicals selected from —$CH_2$—$_n$, where n is an integer of 4 to 7, and —($CH_2$)$_x$O—($CH_2$)$_x$ wherein x is an integer from 2 to 6. In cases wherein $R^3$ and $R^4$ are joined together by a radical of the formula —($CH_2$)$_x$O—($CH_2$)$_x$ it is preferred for x to represent 2. In these N-chlorothio-sulfonamides, $R^1$ and $R^2$ are preferably selected from alkyl radicals having 1 to 6 carbon atoms, phenyl radicals, monoalkyl substituted phenyl radicals having from 7 to 10 carbon atoms and dialkyl substituted phenyl radicals having from 8 to 11 carbon atoms. Most preferably $R^1$ and $R^2$ are radicals selected from the group consisting of methyl groups, ethyl groups, propyl groups, butyl groups, phenyl groups, and p-chlorophenyl groups.

Representative of the radicals suitable for $R^1$ are radicals selected from methyl, tert-butyl, cyclohexyl, 2-ei-cosyl, benzyl, 2-(p-n-undecylphenyl-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R_3$ and $R^4$ are methyl, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophyenyl and 3-chloro-4-(n-butyl)phenyl radicals.

Representative of radicals suitable for $R^2$ are methyl, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)phenyl radicals.

Representative examples of N-chlorothio-sulfonamides which can be used in the present invention are N-chlorothio-N-methyl-methanesulfonamide, N-chlorothio-N-methyl-benzenesulfonamide, N-chlorothio-N-methyl-p-toluenesulfonamide, N-chlorothio-N-ethyl-p-toluenesulfonamide, N-chlorothio-N-methyl-ethanesulfonamide, N-chlorothio-N-phenyl-p-toluenesulfonamide, N-chlorothio-N-(2-propyl)-methanesulfonamide, N-chlorothio-N-(1-propyl)-p-chlorobenzensulfonamide, N-chlorothio-N-phenyl-methanesulfonamide, N-chlorothio-N,N',N'-trimethylsulfamide, N-chlorothio-N-methyl-N',N'-(pentamethylene) sulfamide, N-chlorothio-N-methyl-N',N-diethylsulfamide and N-chlorothio-N-phenyl-benzenesulfonamide.

Chlorothio-sulfonamides suitable for use in the present invention, as well as their preparation, have further been described in the patent literature. For example, West German DPS No. 1,156,403, which is incorporated herein by reference in its entirety, shows the preparation of chlorothio-sulfonamides by reaction of a sulfonamide with $SCl_2$ in the presence of an organic acid acceptor. West German DPS No. 1,101,407 shows the preparation of chlorothio-sulfonamides from N,N'-dithiobis(sulfonamides) and chlorine or sulfuryl chloride. The chlorothio-sulfonamides of the present invention can be prepared by analogous procedures.

The EPDM rubber can be modified with an N-chlorothio-sulfonamide utilizing one of several techniques. One such method involves addition of the N-chloirothio-sulfonamide to a solution of the EPDM rubber in an inert organic solvent, such as heptane, hexane, tetrachloroethylene, cyclohexane, methyl cyclohexane, chloroform, hexane, benzene, or toluene. More polar solvents are preferred since they increase the rate of formation of polymer bound adduct. For example, adduct formation occurs much more rapidly when chloroform is utilized as the solvent than it does when hexane is utilized as the solvent. A mixture of nonpolar solvent with a highly polar solvent may be used advantageously. For example, a mixture of 40 volumes of hexane and 1 volume of acetic acid can produce substantially faster adduct formation as compared to utilizing hexane alone. Furthermore, the rate of adduct formation can apparently be markedly improved by contact or catalysis with anhydrous zinc chloride.

A second method comprises swelling a solution of the chlorothio-sulfonamide into the polymer using the same type of solvents. Preferably, the solvent/polymer ratio is selected so that essentially all the solvent is taken up by the polymer. For this process, it is preferable that the polymer is first prepared in the form of small chunks, or crumbs, and the solvent then added.

A third technique comprises directly milling the chlorothio-sulfonamide into the polymer by means of an internal mixer (Banbury or extruder type) or an open roll mill. For direct mixing, it is advantageous to suspend or dissolve the chlorothio-sulfonamide in a relatively inert medium such as mineral oil or chlorinated paraffin in order to improve dispersion as well as minimize hydrolysis by atmospheric moisture.

The additions of the N-chlorothio-sulfonamide in solution, or by swelling may be generally carried out at a temperature in the range of about 10° C. to about 125° C., but preferably in a range of about 20° C. to about 80° C., ambient temperature being the most convenient and practical in the majority of cases. Direct mixing is preferably carried out at the lowest temperature compatible with good polymer processing characteristics, which is usually in the temperature range of about 60° C. to about 170° C.

The preferred amount of chlorothio-sulfonamide added depends on the specific nature of the EPDM rubber being modified, the specific nature of any highly unsaturated rubbery polymer that may be blended with the modified EPDM rubber and the specific cure system that will ultimately be employed. The molar ratio of chlorothio-sulfonamide employed to vinyl groups in the EPDM rubber being treated will generally be in the range of from about 0.1:1 to about 1.2:1. It is generally preferred for this ratio to be within the range of about 0.9:1 to about 1.1:1. It will normally be most preferred for a molar ratio of 1:1 to be utilized. U.S. Pat. No. 3,915,907 and U.S. Pat. No. 3,970,133, both of which are incorporated herein by reference in their entirety, disclose specific techniques for modifying EPDM rubbers with chlorothio-sulfonamides.

The thermoplastic resin which is utilized in the alloys of this invention can be essentially any type of thermoplastic resin known to persons skilled in the art which can be processed at a temperature low enough to keep the highly unsaturated rubbery polymer and the modified EPDM rubber from degrading. Some representative examples of suitable thermoplastic resins include polyolefins, such as polyethylene and polypropylene, polyesters, such as polyethylene terephthalate, polyethylene isophthalate and polybutylene terephthalate, polycarbonates, nylons, acrylonitrile-butadiene-styrene polymer (ABS), polyemthylmethacrylate, polystyrene-co-acrylonitrile, and polystryene.

The amount of highly unsaturated rubbery polymer, modified EPDM rubber, and thermoplastic resin utilized in the alloys of the present invention can vary greatly. Such alloys can be tailor-made so as to provide a desired combination of properties by varying the amounts of the different polymeric constituents utilized in making such alloys. In most cases, such polymer alloys will contain from 20 to 80 weight percent thermoplastic resin, 10 to 90 weight percent modified EPDM and 10 to 90 weight percent highly unsaturated rubbery polymer. It is generally preferred for such alloys to contain from 25 to 40 weight percent thermoplastic resin, from 25 to 40 weight percent modified EPDM, and from 25 to 40 weight percent highly unsaturated rubbery polymer.

The alloys of this invention are prepared by melt mixing the thermoplastic and rubber components at a temperature which is above the melting point of the thermoplastic resin being utilized in the blend. It is essential for the rubber components to be well dispersed throughout the thermoplastic component of the blend. This can be done by utilizing any number of mixing techniques. Generally, this mixing is done at a temperature within the range of about 150° C. to about 300° C. If the mixing is attempted at a temperature higher than about 300° C., the rubber component can be degraded by the high temperature. In order to minimize polymer degradation, it is preferable to utilize a mixing temperature which is only slightly higher than the melting temperature of the thermoplastic resin utilized in the alloy. For instance, a mixing temperature within the range of about 180° C. to about 220° C. can be utilized in preparing alloys with contain polypropylene A mixing temperature which is within the range of about 160° C. to about 200° C. is preferred for preparing alloys which contain polyethylene. It is preferable to prepare alloys which utilize polystyrene as the thermoplastic resin at a temperature which is within the range of about 170° C. to about 210° C. Alloys containing nylon-6,9 or polycarbonate are preferably mixed at a temperature which is within the range of about 210° C. to about 240° C. It will generally be desirable to conduct the mixing process under a nitrogen atmosphere in order to minimize oxidative and/or hydrolytic degradation.

One technique that can be used in preparing the alloys of this invention is to first mix the rubber components together with appropriate rubber compounding agents, such as sulfur, accelerators, and antidegradants and then to cure and grind the vulcanized blend. The rubber components can be easily mixed together with the rubber chemicals desired in an internal mixer, such as a Banbury mixer, or the mixing can be carried out on a mill mixer. The vulcanized rubber composition is then blended into the thermoplastic resin utilizing an internal mixer.

A preferred technique that can be used in preparing such alloys is to first mix the modified EPDM rubber and the highly unsaturated rubbery polymer in a continuous manner with any desired rubber chemicals using an apparatus that will apply the high shearing forces necessary for thorough mixing. The compounded rubber mixture prepared can then be continuously mixed with the thermoplastic resin again using an apparatus that will apply sufficiently high shearing forces to thoroughly mix the rubber components throughout the thermoplastic resin at a temperature which is adequate to maintain the thermoplastic resin in the molten state. During this mixing, sulfur and accelerators are added to dynamically vulcanize the modified EPDM/highly unsaturated rubber phase. It should be noted that a gross mixture of the required components may be further mixed by processing equipment, such as an injection molding machine.

The highly unsaturated rubbery polymer is covulcanized with the modified EPDM rubber by dynamic vulcanization. Dynamic vulcanization differs from conventional static vulcanization techniques in that the vulcanization occurs during mixing or mastication of the composition being prepared. Even though the rubbery component of the alloy is vulcanized during the mixing procedure, the alloy prepared does not lose processability as a result of the vulcanization. This is because cured rubber particles are dispersed throughout the molten thermoplastic resin. Thus, even when the rubbers are fully cured, the alloy does not lose its thermoplastic nature because the rubbery components are dispersed throughout the molten thermoplastic resin, which is the ocntinuous phase of the alloy. However, if a sufficient amount of highly unsaturated rubbery polymer and modified EPDM rubber are present in the alloy, particles may interfere with one another to give a somewhat continuous rubber phase.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLE 1

In the first step of the procedure, 81.1 g (50 parts) of a modified EPDM rubber was blended with 162.2 g (100 parts) of napthenic oil and 56.8 g (35 parts) of hydrated silica in a midget Banbury mixer. This mix is identified as Masterbatch I. The EPDM rubber utilized was DuPont Nordel TM 2744 which contains about 75% ethylene, about 22% propylene and about 3-4% 1,4-hexadiene. The EPDM rubber was modified with 2.9 weight percent N-chlorothio-N-methyl-benzenesulfonamide. A blend containing 227.3 g (50 parts) of nitrile rubber (Goodyear Chemigum TM N608), 68.2 g (15 parts) of dioctylphthalate, and 4.55 g (1 part) of an antioxidant was separately prepared in a midget Banbury mixer and was identified as Masterbatch II. Subsequently, Masterbatch I and Masterbatch II were mill mixed to form Masterbatch III. Rubber alloys were then prepared by mixing 251 parts of Masterbatch III with 60 parts of polypropylene, (Profax 6723) 5 parts of zinc oxide and 1 part of stearic acid in a Brabender mixer which was maintained at 185° C. and which was operated at 100 rpm. About 2 minutes after the polypropylene melted, 1 part of tetramethylthiuram disulfide and 0.5 parts of benzothiazyl disulfide were added.

Approximately 30 seconds later, 2 parts of sulfur were added. The composition was mixed for about 2.5 minutes after maximum torque was achieved. Tensile sheets were then pressed and tested for tensile strength, elongation, modulus and shore A hardness. It was determined that the polymer alloy produced had a tensile strength of 625 psi ($4.3 \times 10^6$ Pascals), an elongation of 340%, 300% modulus of 600 psi ($4.1 \times 10^6$ Pascals), and a shore A hardness of 74.

COMPARATIVE EXAMPLE 2

This experiment was conducted in order to show that similar blends which contain conventional EPDM rubbers have inferior properties. This experiment was conducted utilizing essentially the same technique as is described in Example 1 except that the EPDM rubber utilized in the blend was not modified. The blend prepared in this experiment had a tensile strength of 450 psi ($3.1 \times 10^6$ Pascals), an elongation of 410%, a 300% modulus of 425 psi ($2.9 \times 10^6$ Pascals), and a shore A hardness of 72. This experiment clearly shows that the polymer alloy prepared utilizing the modified EPDM rubber had superior tensile strength.

EXAMPLE 3

This example shows how tensile strength of the alloy can be increased by decreasing the amount of naphthenic oil in Masterbatch I. 400 parts of Masterbatch I was mixed in a Banbury with 75.6 parts of hydrated silica and 108 parts of Nordel TM 2744 which was modified with 2.9 weight percent of N-chlorothio-N-methyl-benzenesulfonamide. This material is referred to as Masterbatch IV. 135 parts of Masterbatch IV were mixed with 66 parts of Masterbatch II to give a modified EPDM/nitrile blend (Masterbatch V). 201 parts of Masterbatch V were mixed with 60 parts of polypropylene (Profax TM 6723), 5 parts of zinc oxide and one part of stearic acid in a Brabender mixer which was maintained at 185° C. and operated at 100 rpm. About 2 minutes after the polyproplylene melted, 1 part of tetramethyl-thiuram disulfide and 0.5 parts of benzothiazyl disulfide were added. The composition was mixed for 2.5 minutes after the maximum torque was achieved.

COMPARATIVE EXAMPLE 4

This experiment was conducted in order to show that similar blends which contain conventional EPDM rubbers have inferior properites, even if the naphthenic oil level is reduced. This experiment was conducted utilizing essentially the same technique as is described in Example 2 except that unmodified Nordel TM 2744 was used in place of modified EPDM. The following table compares the test data for materials from Examples 3 and 4:

TABLE I

|  | Example 3 | Comparative Example 4 |
| --- | --- | --- |
| Room Temperature |  |  |
| Tensile strength (Pa) | $7.2 \times 10^6$ | $5.2 \times 10^6$ |
| Elongation | 330% | 370% |
| Hardness (Shore A) | 81 | 80 |
| 100° C. |  |  |
| Tensile strength (Pa) | $2.1 \times 10^6$ | $6.2 \times 10^5$ |
| Elongation | 230% | 260% |
| Fluid Aging 70 hrs. @ 250° F. in ASTM #3 Oil |  |  |
| Tensile strength (Pa) | $2.6 \times 10^6$ | $1.0 \times 10^6$ |

TABLE I-continued

|  | Example 3 | Comparative Example 4 |
| --- | --- | --- |
| Elongation | 140% | 80% |

While certain representative embodiments and details have been shown for the purpose of illustrating the present invention, it will be apparent to those having ordinary skill in this art that various changes and modifications can be made therein without departing from the scope of the invention.

What is claimed is:

1. A polymer alloy which is comprised of (a) at least one highly unsaturated rubbery polymer which is covulcanized with at least one N-chlorothio-sulfonamide modified EPDM rubber and (b) at least one thermoplastic polyolefin.

2. A polymer alloy which is comprised of (a) a nitrile rubber which is covulcanized with a least one N-chlorothio-sulfonamide modified EPDM rubber and (b) at least one thermoplastic polyolefin.

3. A process for preparing a polymer alloy which comprises (a) dispersing at least one highly unsaturated rubbery polymer and at least one N-chlorothio-sulfonamide modified EPDM throughout at least one thermoplastic polyolefin to produce a polymer blend and (b) mixing vulcanizing agents into said blend and heating the polymer blend to a temperature and for a time sufficient to covulcanize the highly unsaturated rubbery polymer and the N-chlorothio-sulfonamide modified EPDM to produce the polymer alloy.

4. A polymer alloy as specified in claim 1 wherein said alloy is comprised of from 20 to 80 weight percent of said thermoplastic polyolefin, from about 10 to 90 weight percent of said modified EPDM rubber, and from about 10 to about 90 weight percent of said highly unsaturated rubbery polymer.

5. A rubber alloy as specified in claim 2 wherein said rubber alloy is comprised of from about 20 to about 80 weight percent of said thermoplastic polyolefin, from about 10 to about 90 weight percent of said nitrile rubber, and from about 10 to about 90 weight percent of said modified EPDM rubber.

6. A rubber alloy as specified in claim 5 wherein said thermoplastic polyolefin is polypropylene.

7. A process as specified in claim 3 wherein said heating is carried out in the presence of sulfur and wherein said heating is to a temperature which is above the melting point of the thermoplastic polyolefin.

8. A rubber alloy as specified in claim 6 wherein said modified EPDM rubber has a molar ratio of ethylene to propylene which is within the range of about 30/70 to about 70/30.

9. A rubber alloy as specified in claim 8 wherein said modified EPDM rubber is modified with N-chlorothio-N-methyl-benezenesulfonamide.

10. A rubber alloy as specified in claim 6 wherein said modified EPDM is comprised of repeat units which are derived from about 75 weight percent ethylene, about 22 weight percent propylene, and about 3 weight percent 1,4-hexadiene.

11. A rubber alloy as specified in claim 10 wherein said modified EPDM rubber is modiifed with N-chlorothio-N-methyl-benzenesulfonamide.

12. A rubber alloy as specified in claim 11 wherein said rubber alloy is comprised of from about 25 to 40 weight percent polypropylene, from about 25 to 40 weight percent modified EPDM, and from about 25 to 40 weight percent nitrile rubber.

13. A process as specified in claim 3 wherein the highly unsaturated rubbery polymer and the N-chlorothio-sulfonamide modified EPDM are dynamically vulcanized.

14. A process as specified in claim 13 wherein said highly unsaturated rubbery polymer is a nitrile rubber.

15. A process as specified in claim 14 wherein said thermoplastic polyolefin is polypropylene.

16. A process as specified in claim 15 wherein said dynamic vulcanization is done at a temperature which is within the range of about 180° C. to about 220° C.

17. A process as specified in claim 16 wherein said modified EPDM is comprised of repeat units which are derived from ethylene, propylene, and 1,4-hexadiene.

18. A process as specified in claim 13 wherein said dynamic vulcanization is done at a temperature which is in the range of aobut 150° C. to about 300° C.

19. A process as specified in claim 17 wherein said modified EPDM is modified with N-chlorothio-N-methyl-benzenesulfonamide.

* * * * *